Jan. 17, 1939.　　　M. G. CHANDLER　　　2,143,935
FUEL FEEDING MEANS FOR INTERNAL COMBUSTION ENGINES
Original Filed May 14, 1934　　9 Sheets-Sheet 1

Inventor
M. G. CHANDLER
Attorneys

Jan. 17, 1939. M. G. CHANDLER 2,143,935
FUEL FEEDING MEANS FOR INTERNAL COMBUSTION ENGINES
Original Filed May 14, 1934 9 Sheets-Sheet 5

Inventor
M. G. Chandler.
By Patterson ...
Attorneys

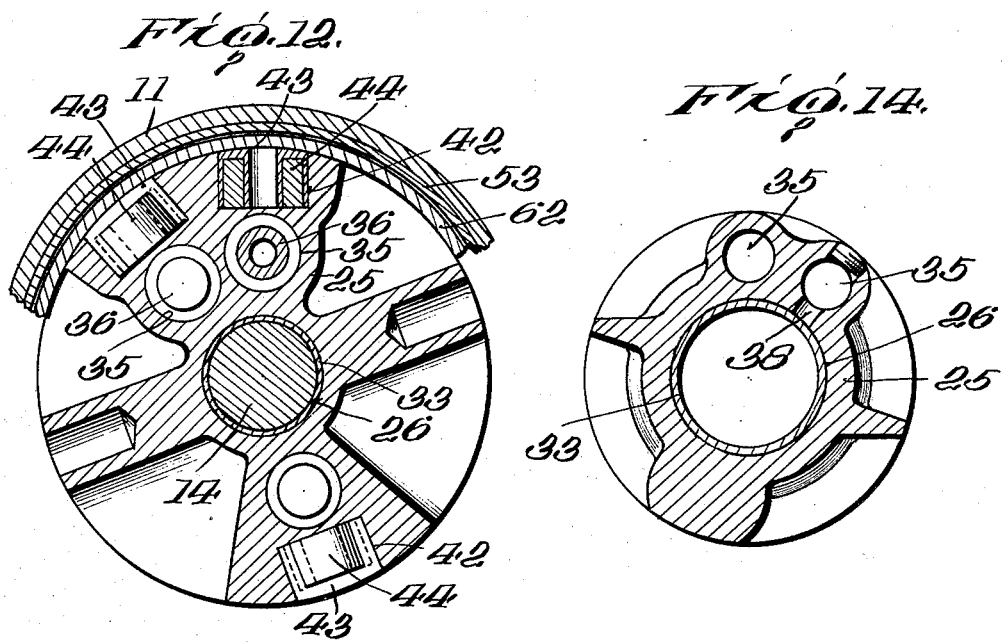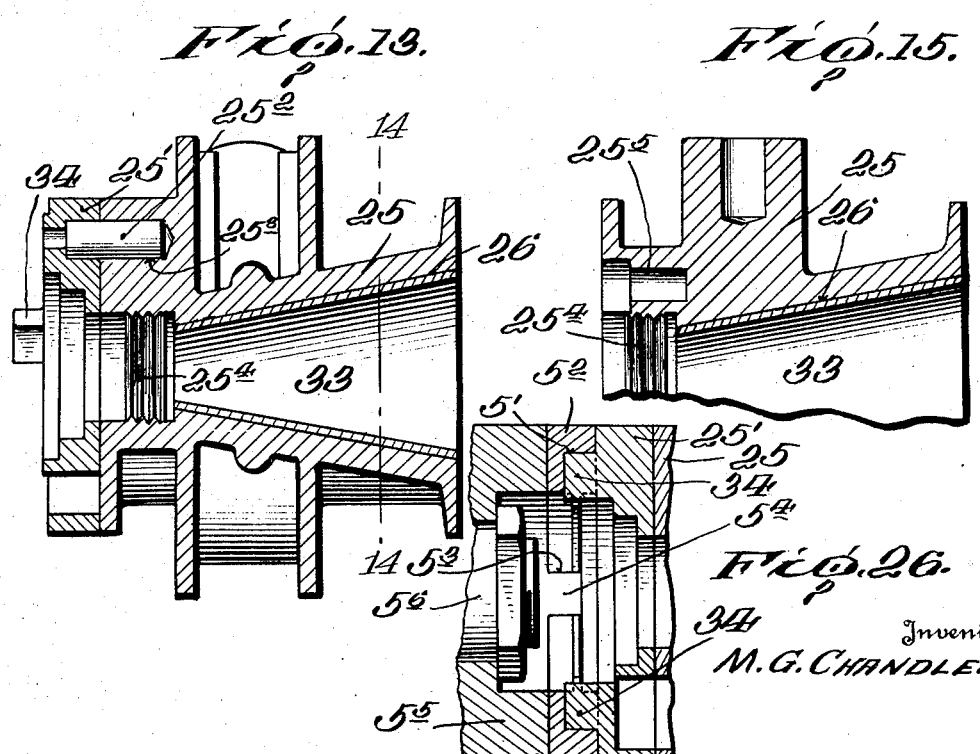

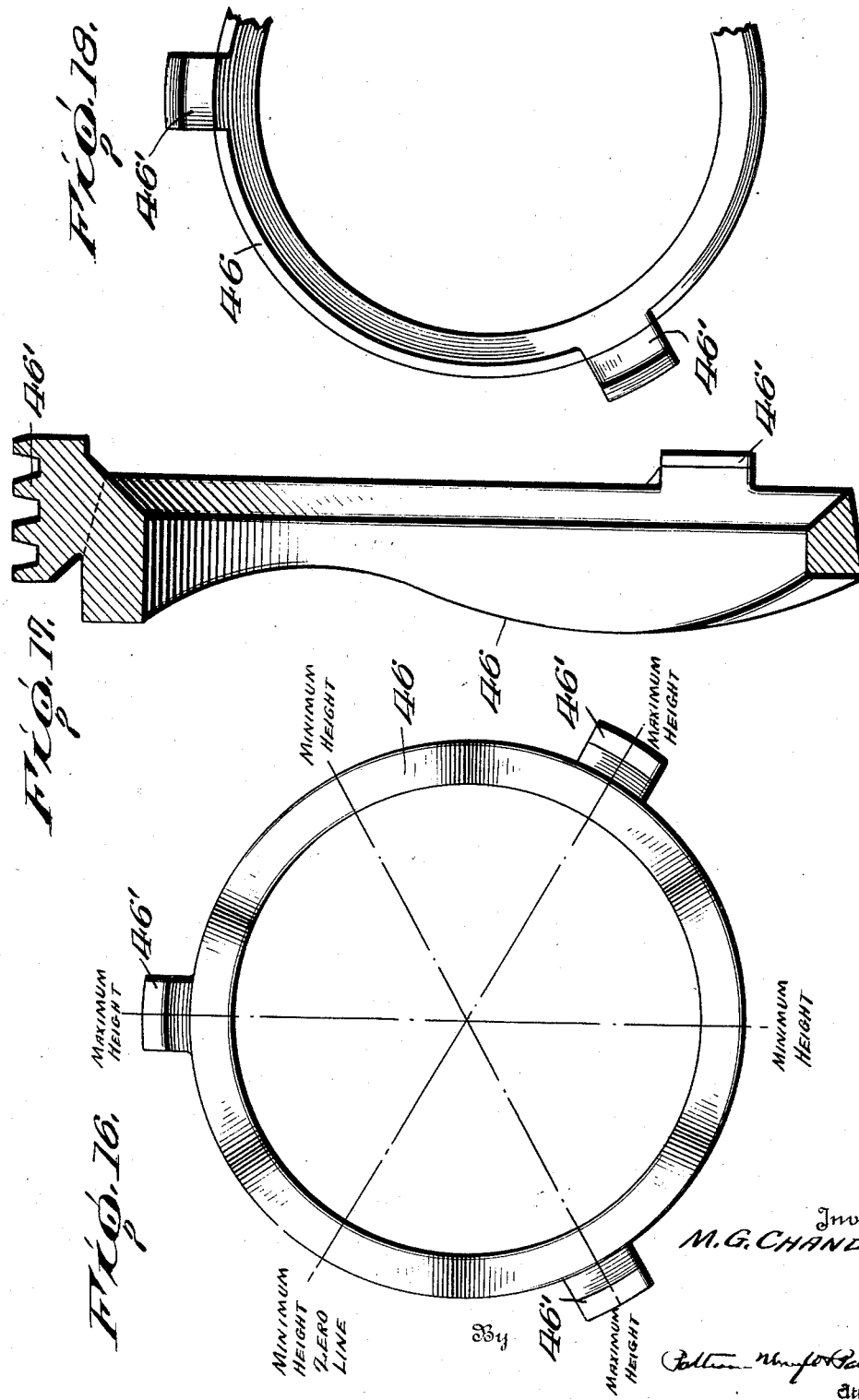

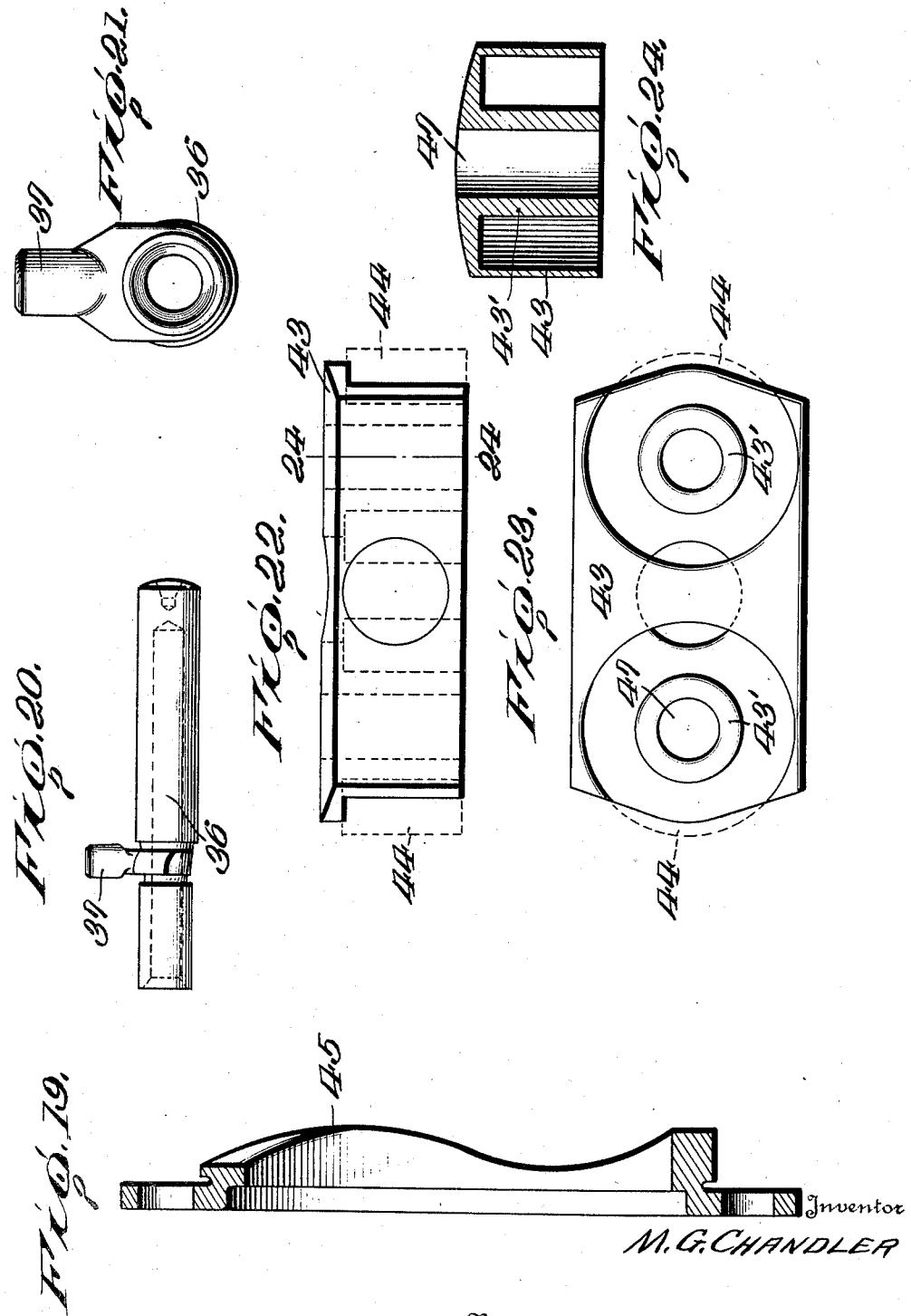

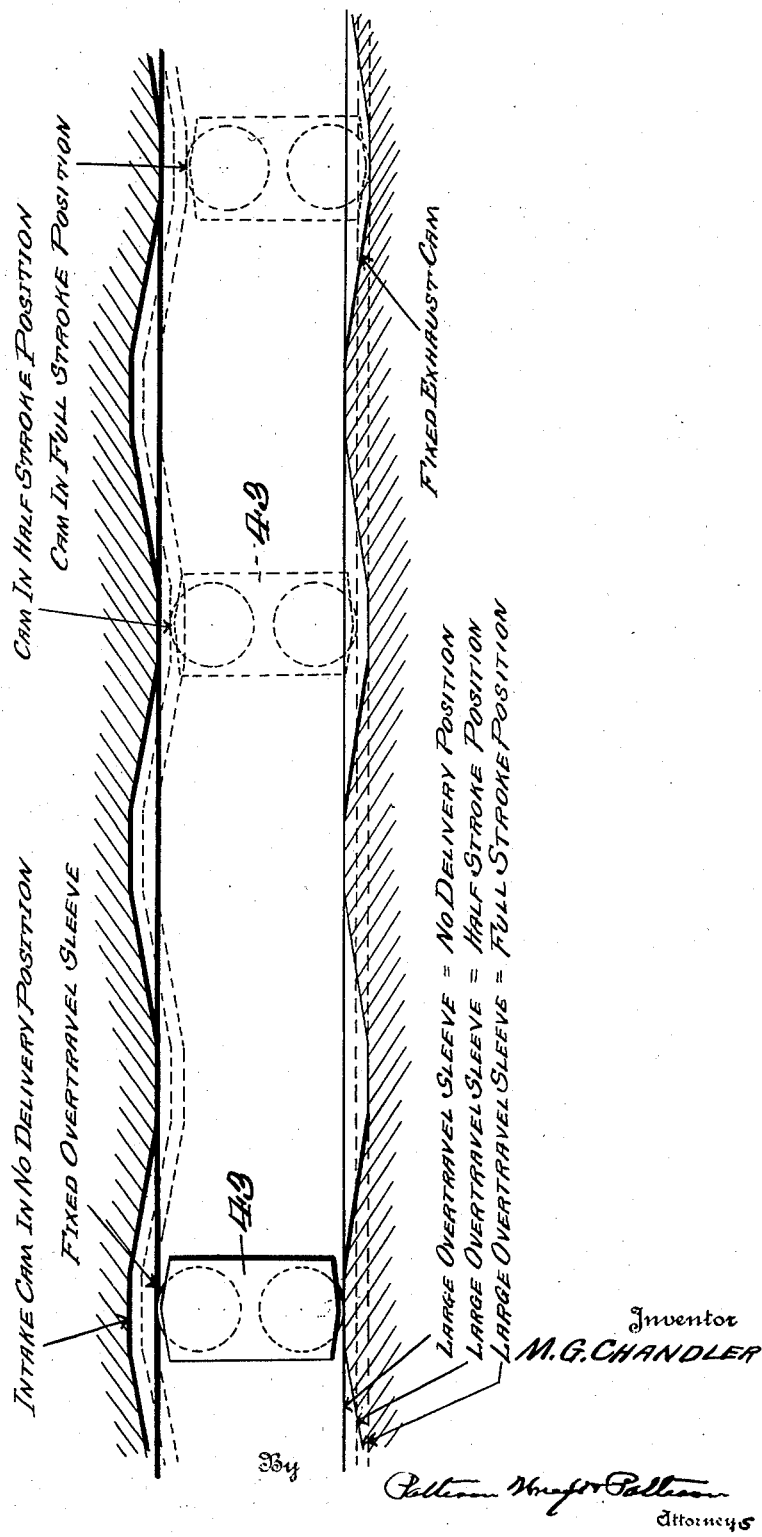

Patented Jan. 17, 1939

2,143,935

UNITED STATES PATENT OFFICE 2,143,935

FUEL FEEDING MEANS FOR INTERNAL COMBUSTION ENGINES

Milford G. Chandler, Flint, Mich., assignor, by mesne assignments, to Borg-Warner Corporation, Chicago, Ill., a corporation of Illinois Application May 14, 1934, Serial No. 725,665
Renewed June 23, 1938

30 Claims. (Cl. 103—162)

This invention relates to fuel feeding means for internal combustion engines and is an improvement on my application for fuel feeding means for internal combustion engines, filed July 5, 1928, Serial Number 290,492, since issued as Patent No. 2,022,653, bearing date of December 3, 1935, the object being to simplify the construction and to provide two over-travel sleeves, one fixed and the other movable, the movable over-travel sleeve being held against the intake cam by resilient means, such as springs, these sleeves limiting the movement of the rollers on both the exhaust and intake strokes to prevent any movement of the rollers after they have reached the peak of the cams.

Another object of my invention is to provide a constuction employing two rollers for contacting independently with the opposing cams so as to prevent drag and allow the rollers to roll and contact with the cams instead of being dragged in contact therewith under certain conditions.

Another object of my invention is to provide a construction of fuel feeding means for internal combustion engines employing a variable stroke pump in which a rotor is mounted on a stationary cone so as to be completely supported radially and axially by its fit thereon, a ball bearing being flexibly mounted in such a way that it merely conveys tension to the rotor to force it on the cone, thus providing means for allowing the rotor to creep back and forth on the cone as the contraction and expansion varies so as to provide a floating or self-seating construction to compensate for wear of the contacting inclined surfaces whereby these surfaces remain in contact at all times and under all conditions so as to practically prevent leakage.

Another object of my invention is to provide a strainer for the fuel entering the pump, which strainer locks the cone in the frusto-conical seat with outlet ports in register with ports to which pipes are connected leading to the respective cylinders of the internal combustion engine to which the fuel feeding means is attached.

A still further object of the invention is to provide novel means for maintaining the packing of the plungers in its proper position so that wear is compensated for and yet allows the plungers free movement.

Another and further object of the invention is to provide the rotor with guideways in which shoes carrying rollers are mounted.

Other and further objects and advantages of the invention will be hereinafter set forth and the novel features thereof defined by the appended claims.

In the drawings:

Figure 9 is a section taken on line 9—9 of Figure 7;

Figure 10 is a section taken on line 10—10 of Figure 7;

Figure 11 is a section taken on line 11—11 of Figure 7;

Figure 12 is a section taken on line 12—12 of Figure 3;

Figure 13 is a section taken on line 13—13 of Figure 8;

Figure 14 is a section taken on line 14—14 of Figure 13;

Figure 15 is a section taken on line 15—15 of Figure 8;

Figure 16 is a side elevation of the intake cam detached;

Figure 17 is a transverse section through the same;

Figure 18 is a reverse plan view to that shown in Figure 16, partly broken away;

Figure 19 is a section through the exhaust cam;

Figure 20 is a side elevation of the plunger detached;

Figure 21 is an end elevation of the plunger;

Figure 22 is an elevation of the roller shoe and rollers;

Figure 23 is a bottom plan view of the same;

Figure 24 is a vertical top section through one of the roller shoes;

Figure 25 is a diagrammatic view showing the operation of the cams and over-travel shoes for controlling the plungers; and Figure 26 is a detail section through a portion of the driving gear assembly and the rotor showing the driving connection.

Figure 1:
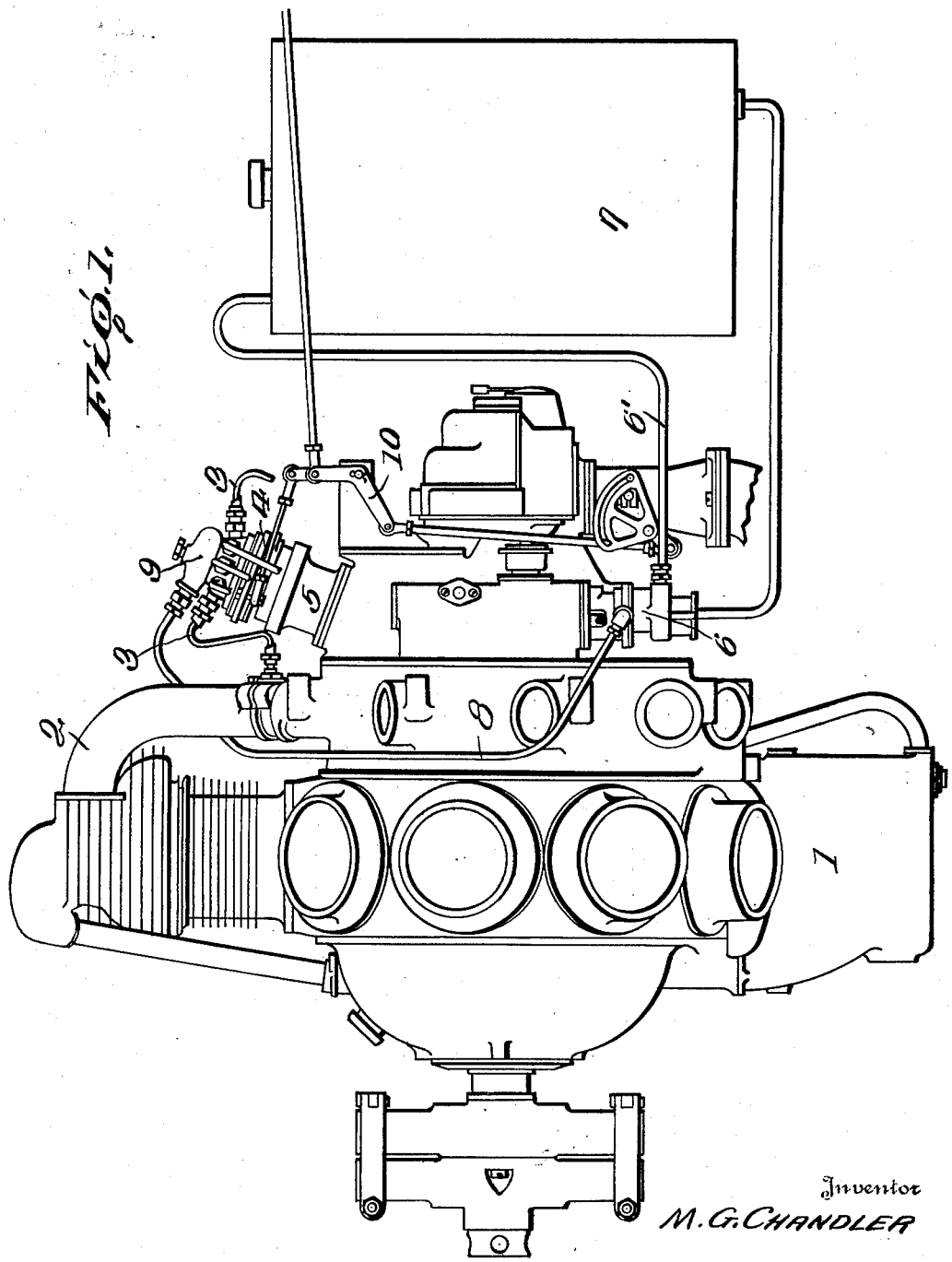
Figure 1 is a side elevation of a multiple cylinder internal combustion engine showing the application of my improved construction of fuel feeding means thereto.
Figure 2:
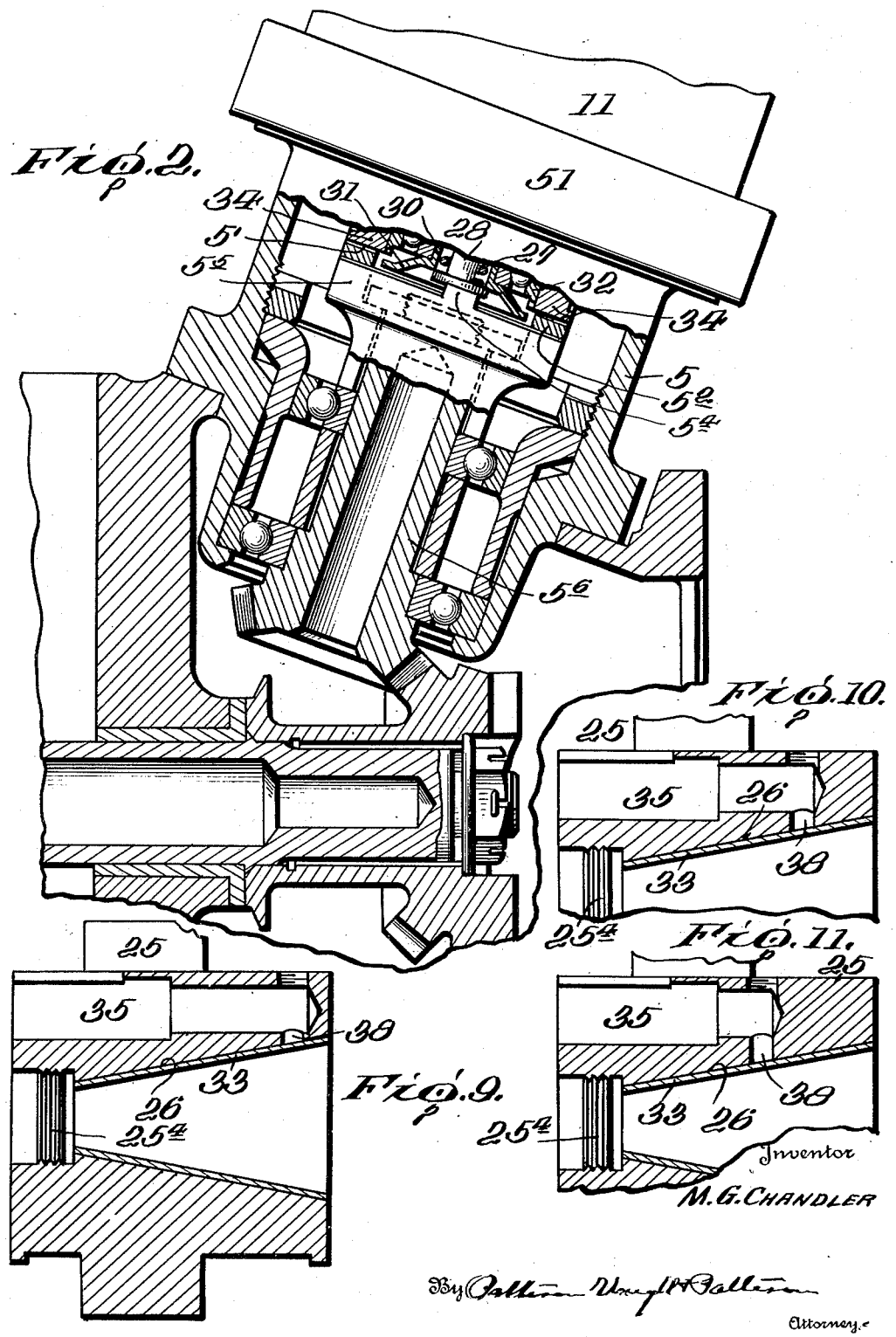
Figure 2 is a detail enlarged section, partly in elevation, showing the driving gear assembly connecting the rotary pump to the engine so that it will be driven and timed thereby.
Figure 3:
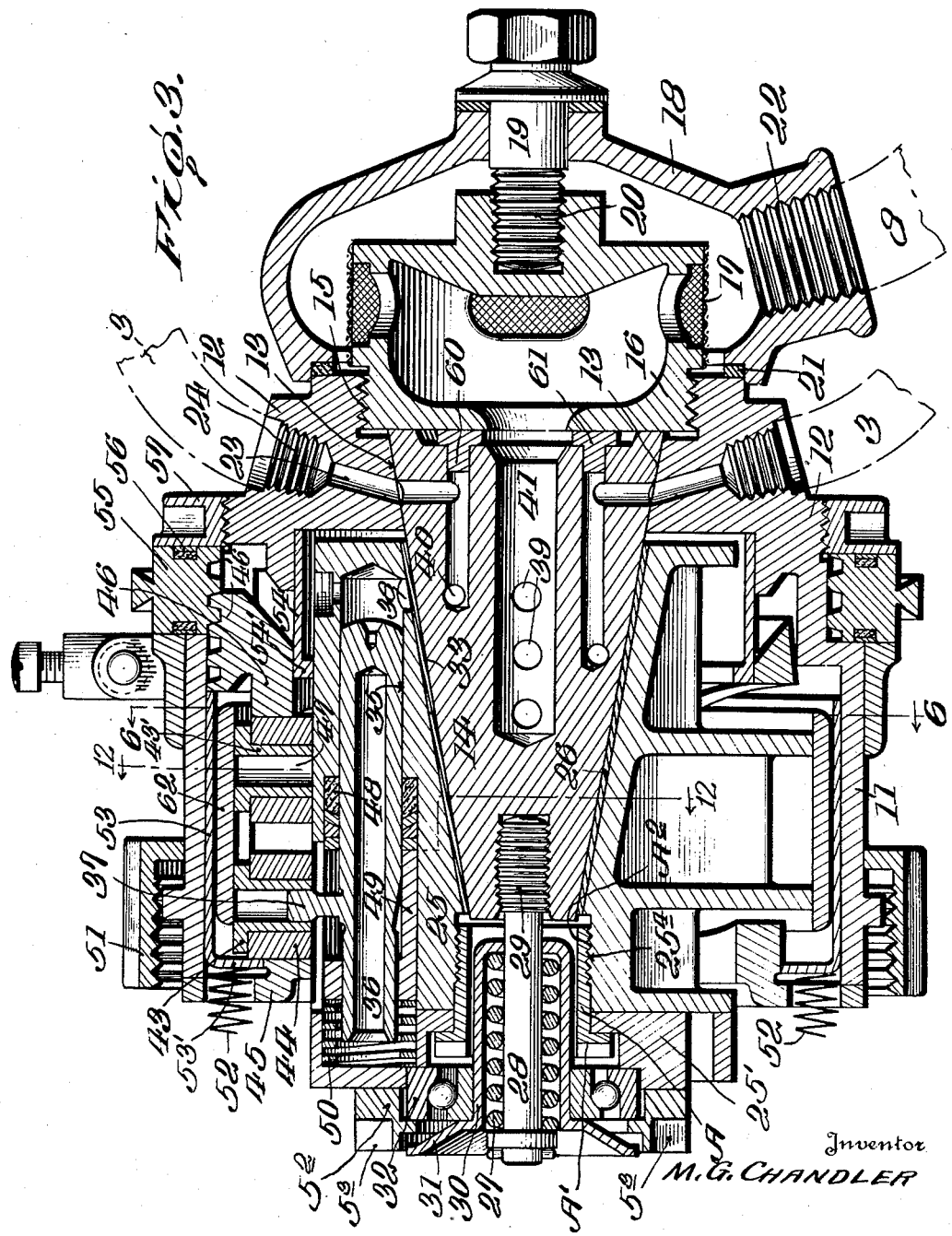
Figure 3 is a longitudinal section through the pump.
Figure 4:
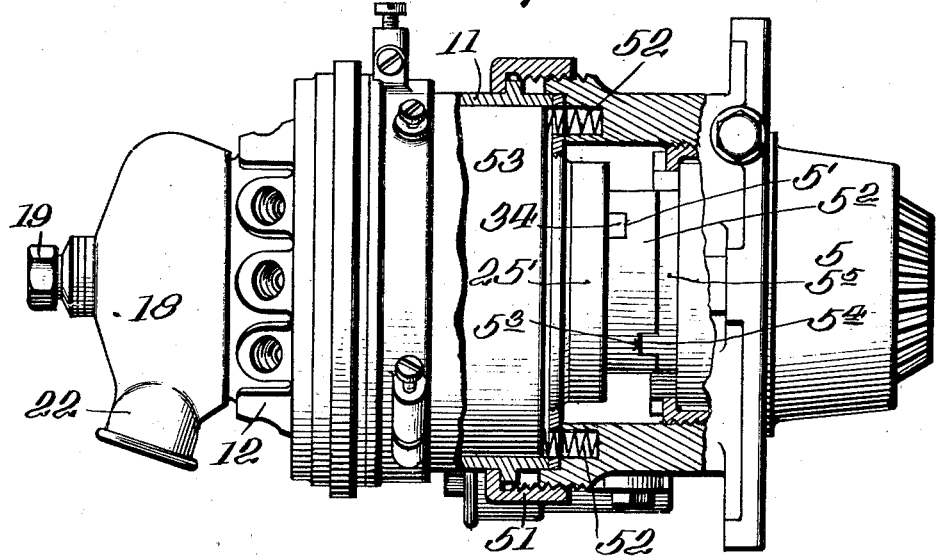
Figure 4 is a side elevation of the pump attached showing the manner of connecting the same to the driving gear assembly.
Figure 5:
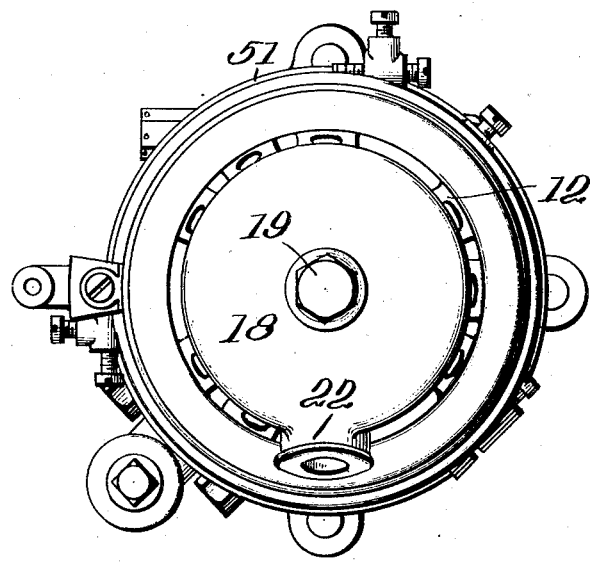
Figure 5 is an end elevation of the pump.
Figure 6:
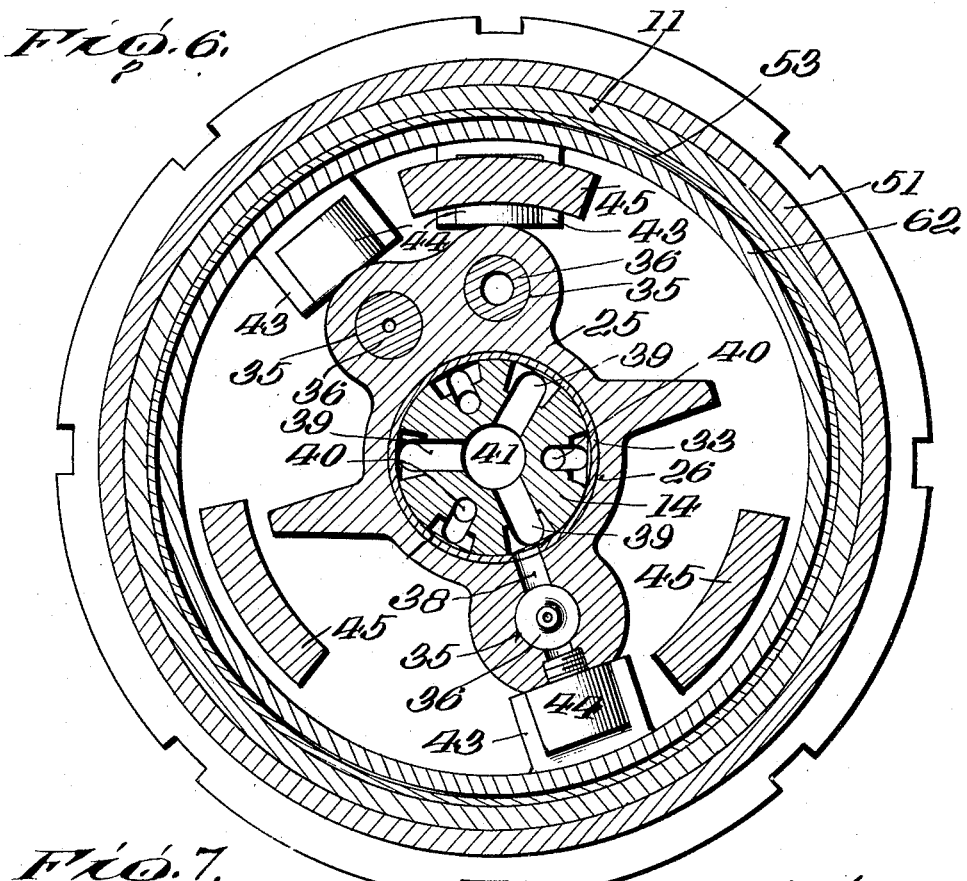
Figure 6 is a section taken on line 6—6 of Figure 3.
Figure 7:
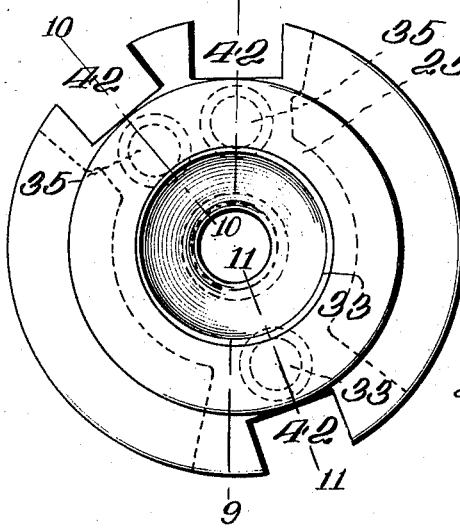
Figure 7 is an end elevation of the rotor.

In Figure 1 of the drawings, 1 indicates an internal combustion engine provided with a series of air intakes 2 in which are disposed fuel nozzles (not shown) supplied with fuel by pipes 3 of a pump 4, which is connected to a driving gear assembly 5 driven by the engine as clearly shown in Figure 2 whereby the pump with its variable stroke pistons will be driven and timed by the engine for delivering measured charges of fuel to the air intake of the engine.

In the application of my improved construction of fuel feeding means as herein shown, an auxiliary pump 6 is employed which is supplied with fuel from a fuel reservoir 7, which pump supplies fuel through a pipe 8 to a strainer 9 carried by the pump 4 so that the fuel supplied to the measuring pump will be strained.

The strokes of the pistons of the pump are regulated by an adjustable cam as disclosed in my prior application, which cam is operated through control mechanism 10, which in turn is connected to the air throttle through which air is drawn or forced by a supercharger so that the proper proportion of fuel to air will be maintained in the operation of a fuel feeding system constructed in accordance with my invention.

In the prior construction of fuel feeding system for internal combustion engines disclosed in my application Serial Number 290,492, filed July 5, 1928, I have disclosed a connection between the cam adjusting means and the air throttle so as to maintain the proper proportion of fuel to air and I have shown and described a particular type of nozzle for delivering the charge to the air intake of the engine and therefore I have refrained from illustrating in this application any detailed construction for accomplishing this result as this invention relates more particularly to structural features of the pump, but, it is, of course, understood that while I have shown in this application an auxiliary pump for supplying fuel to the fuel measuring pump, this auxiliary pump can be dispensed with without departing from the spirit of my invention and therefore I do not wish to limit myself to the use of the particular construction of pump as herein shown and described to any type of engine or to any particular manner of installing the same as I am aware that various changes can be made in the installation of the pump in order to produce a fuel feeding system for an internal combustion engine without departing from the spirit of my invention.

In constructing a pump as herein illustrated, I employ a casing 11 which is provided with a head 12 having a frusto-conical seat 13 to receive a cone 14. The head is internally threaded at 15 in which is screwed a strainer body 16 which locks the cone 14 rigidly within the frusto-conical seat of the head of the casing. The strainer body is provided with a circular strainer 17 and is enclosed in a strainer cap 18 which is locked in position by a bolt 19 working in a threaded bore 20, a suitable packing 21 being disposed in a rabbet formed on the cap so as to form a liquid tight contact between the head of the casing and the cap of the strainer. The strainer cap is provided with an internally threaded nipple 22 to which the pipe 8 is connected for supplying fuel to the pump.

The head 12 of the casing is provided with outlet passages 23 enlarged and internally threaded as shown at 24 in which are disposed couplings connecting the pipes 3 thereto which lead to the respective air intakes of the engine.

Mounted within the casing 11 is a rotor 25 having a conical socket 26 to receive the cone 14 and upon which it is mounted so as to rotate. The rotor is held on the cone under spring tension through the medium of a spring 27 surrounding a stud 28 which is threaded into a threaded socket 29 formed in the end of the cone, said spring being enclosed in a tubular member 30 which is enlarged as shown at 31 and engages the ball thrust bearing 32 so as to exert pressure on the end member 25' of the motor in order to force it inwardly over the cone whereby the two inclined surfaces will be held in contact with one another.

In the construction herein shown the rotor is provided with a bearing surface as shown at 33 in the form of a lining or bushing formed of a suitable material and provided with suitable lubricating means, such for example as fully described in a companion application Serial No. 725,666 filed even date herewith.

The end member 25' of the rotor is provided with lugs 34 extending into notches 5' of a ring $5^2$ which is provided with notches $5^3$ to receive lugs $5^4$ of a member $5^5$ carried by the driving shaft $5^6$ of the driving gear assembly as shown in Figures 2 and 26 whereby the rotor will be driven and timed by the engine so that measured charges of fuel will be delivered to the respective cylinders at the proper time, all of which is fully shown and described in my application filed July 5, 1928, Serial Number 290,492.

The rotor 25 is provided with longitudinal bores 35 forming cylinders herein shown three in number in which are mounted pump plungers 36 provided with lateral projections 37 forming means for reciprocating the same through mechanism hereinafter fully described.

The ends of the pump cylinders are provided with lateral ports 38 which are adapted to successively register with inlet ports 39 and outlet ports 40, the inlet ports 39 extending from an axial bore 41 which is in communication at all times with the interior of the strainer body through which fuel is adapted to be drawn or forced so as to supply the pump with the fuel to be measured.

Figure 8:
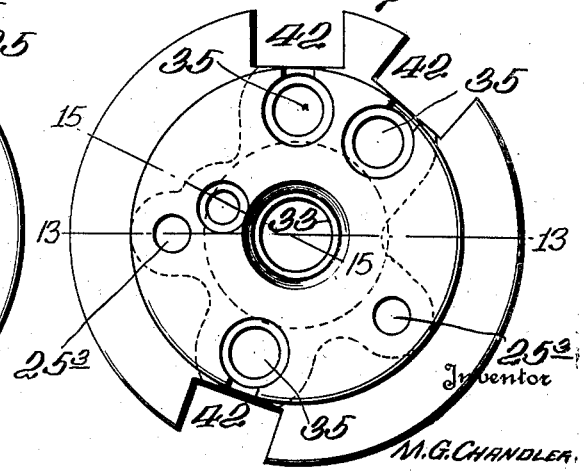
Figure 8 is an end elevation of the opposite end of the rotor.

The end member 25' is provided with bores to receive dowel pins $25^2$ arranged in bores $25^3$ of the rotor 25 as shown in Figures 8 and 13 forming a driving connection between the rotor and end member. The end member 25' is held in locked engagement with the rotor by a sleeve A provided with a tool receiving head A' for turning the same. The inner end of the sleeve is threaded as shown at $A^2$ which works in a threaded portion $25^4$ of the rotor 25 whereby the end member can be forced and held into contact with the rotor in such a manner that the end member and rotor can be readily assembled or taken apart. The sleeve A is fluted and is adapted to be engaged by a spring detent mounted in a bore $25^5$ (Fig. 15) of the rotor so as to prevent the sleeve from turning.

The outlet ports communicate successively with the passages 23 so that the fuel from the pumps will be delivered to the respective cylinders through the pipes 3, the construction of the inlet and outlet ports being substantially the same as shown in my companion application filed July 5, 1928, Serial Number 290,492, the ports being arranged so that fuel will be drawn into the pump cylinders and discharged therefrom to the respective cylinders of the internal combustion engine.

Formed longitudinally in the periphery of the rotor 25 are guideways 42 in which are slidably mounted shoes 43 provided with spaced rollers 44 mounted on hollow studs 43' contacting respectively with the fixed cam 45 and the adjustable cam 46, said roller shoe being constructed substantially as shown in Figures 22, 23 and 24, having central bores 47 to receive the studs and into one of which extends the projection 37 of the plunger 36 so that as these rollers travel over the cams as the rotor revolves, the plungers will be reciprocated. The plungers are surrounded by packings 48 engaged by a sleeve 49 held under pressure by a spring 50, said sleeve being slotted to receive the projection 37 of the plunger. This provides means for holding the plunger in its proper position as it is reciprocated and to form a tight joint to prevent leakage and improves upon the construction disclosed in my application previously referred to.

The pump is connected to the reduction gear assembly 5 by a coupling sleeve 51, said assembly carrying a plurality of coiled springs 52 which engage a movable over-travel sleeve 53 which is held against the intake cams 46 under tension by the resilient spring means. A suitable fixed over-travel sleeve 54 is disposed within the casing and these sleeves limit the movement of the rollers on both exhaust and intake stroke of the plungers to prevent any movement after the rollers have reached the peaks of the cams. This is shown in the diagrammatic view, Figure 25, which also illustrates the advantage of two rollers contacting independently with the opposing cams so as to prevent drag and allows the rollers to roll in contact with the cams instead of being dragged in contact therewith under certain conditions. In the construction employing a single roller as illustrated in the application above referred to, the drag was caused by the need of the rollers to reverse in the direction as the contact changed or as it was actuated first by one and then by the other cam to cause these rollers to travel continuously in one direction as it was impossible to bring the two opposing rollers in contact with a single cam member and it will be noted that as the rollers leave the respective cam and contact on the over-travel sleeves, the direction of rotation remains the same, thereby overcoming the difficulties existing with the prior constructions and providing a very simple and efficient means for reciprocating the plungers.

The over-travel sleeves 54 and 53 are so disposed with respect to the cams that the engaging surface 54' on over-travel sleeve 54 is a distance equal to the overall length of the roller and shoe assembly from the peak of the cam 45. This limits the movement of the roller and plunger assembly on its exhaust stroke to prevent any movement after the roller has reached the peak of the cam 45. The engaging surface 53' of the over-travel sleeve 53 is similarly disposed from the peak of the cam 46. This sleeve is guided within the pump casing and extends up to an abutment on the intake cam 46 so that a longitudinal spacing is maintained whereby the springs 52 are able to create pressure in the direction of the intake cam 46, maintaining the engaging surface of cam 45 at the proper distance from the engaging surface of cam 46.

By having the large over-travel sleeve bearing on the intake cam lug and urged in that direction by the springs, the rollers for actuating the plungers are prevented from traveling beyond the normal length of the intake stroke and this action is maintained regardless of the stroke because the over-travel sleeve is held against the intake cam lug throughout the range of adjustment from the idle position to the full stroke position, the small over-travel sleeve being fixed in proper relation to the exhaust cam and in turn prevents any excess movement on the exhaust stroke.

The intake cam is provided with toothed lugs 46' which are engaged by an internally threaded adjusting ring 55 provided with suitable packing 56, which ring is held in position by a retaining ring 57 whereby the oscillation of the ring will adjust the intake cam in order to vary the stroke of the plunger, the construction being substantially the same as disclosed in my application filed July 5, 1928, Serial Number 290,492, this adjusting ring being connected to the control 10 whereby it moves in unison with the air throttle so as to maintain the proper proportion of fuel and air.

The outlet ports 40 of the cone 14 are formed of bores, the ends of which are closed by plugs 60 provided with heads 61 which are engaged by the strainer body 16 so as to exert pressure on the cone in order to hold it firmly seated in the frusto-conical seat 13.

The rotor is surrounded by a rotor band 62 which closes the guideways in which the roller shoes are slidably mounted so as to prevent the shoes from being displaced.

The fuel feeding means disclosed in this application is intended to be used in connection with an internal combustion engine of the spark ignition type and comprises a fuel feeding system employing a combined pump and distributor driven and timed by the engine for injecting measured charges of liquid fuel into the air intakes of the cylinder with means for simultaneously controlling the measured charges of fuel with the air taken in the cylinders of the engine and while I have not shown the nozzles for spraying the fuel, I wish it to be clearly understood that my system of fuel injection employs means for placing fuel under pressure and injecting said fuel from a nozzle for reducing the fuel to a fine spray whereby an explosive mixture can be produced in which the mixture ratio is controlled throughout the various ranges of speed and load.

While in the drawings I have illustrated and in the specification I have described fuel feeding means for internal combustion engines especially adapted to be used in connection with an internal combustion engine of the spark ignition type, I wish it to be clearly understood that I do not wish to limit myself to the use of my fuel feeding means in connection with any particular type of engine.

In the operation of a fuel feeding means constructed in accordance with my invention disclosed in this application when connected to a multiple cylinder internal combustion engine as shown, the rotor is revolved through the medium of the reduction gear assembly so that it is driven and timed by the engine and as the rotor revolves, the reciprocating plungers carried thereby are reciprocated through the medium of the non-rotatable cams and the two rollers, which contact independently with the opposing cams so as to prevent drag and allow the rollers to roll in contact with the cams instead of being dragged in contact therewith.

As the rotor rotates, the movement of the rollers are controlled by over-travel sleeves, one fixed and the other movable, the movable over-travel sleeve being spring pressed and these sleeves limit the movement of the rollers on both the exhaust and intake strokes so as to prevent any movement after the rollers have reached the peaks of the cams. One of the non-rotatable cams is provided for adjusting the same axially to vary the stroke of the plungers and the means for adjusting this movable cam is connected to air controlling means whereby the proper proportion of fuel and air is maintained so that a thoroughly mixed explosive charge is delivered to the respective cylinders of the engine as the fuel under pressure is discharged through the loaded nozzle in a fine mist which is taken up by the air being forced or drawn into the respective cylinders of the engine.

While in this application as well as in the other applications, I have illustrated a super-charger and an auxiliary pump, I wish it to be clearly understood that the combined pump and distributor for delivering measured charges of fuel to the respective cylinders of the engine will operate without an auxiliary fuel pump or a super-charger and therefore I do not wish to limit myself to the use of these devices.

Application Serial No. 290,492, filed July 5, 1928, since issued as Patent No. 2,022,653, bearing date of December 3, 1935, contains claims directed more broadly to the means for reciprocating the plungers, the means for varying the stroke of the plungers, and means for preventing overtravel. Said application also contains claims directed to the arrangement of the ports in the conical stationary member and the rotor, as well as the means for holding the rotor resiliently on the stationary conical member. Other features disclosed in the present application are claimed in said companion applications Serial Nos. 725,666 and 725,667. Application Ser. No. 725,666 contains claims on the means for detachably securing the rotor to the conical stationary member and the means for tensioning the rotor. Claims directed to the means for supplying fuel to the pump cylinders are contained in application Serial No. 725,667.

What I claim is:

1. In means for feeding fuel to an internal combustion engine, a rotor, a plunger carried by the rotor provided with spaced rollers, spaced non-rotatable cams cooperating independently with said rollers to reciprocate the plunger while the rotor revolves, over-travel sleeves cooperating with said rollers and means cooperating with one of said cams for shifting said cam axially to vary the output of the pump.

2. In means for feeding fuel to an internal combustion engine, a rotor, a plunger carried by the rotor provided with spaced rollers, spaced non-rotatable cams cooperating independently with said rollers to reciprocate the plunger while the rotor revolves, a fixed and a movable over-travel sleeve cooperating with said rollers and oscillating means cooperating with one of said cams for shifting said cam axially to vary the output of the pump.

3. In means for feeding fuel to an internal combustion engine, a rotor, plungers carried by the rotor provided with two rollers individual to each plunger, spaced non-rotatable cams cooperating independently with said rollers to reciprocate the plungers when the rotor revolves, means for limiting the movement of the rollers on the intake and exhaust stroke of the plungers to prevent any movement after the rollers have reached the peaks of the cams, and oscillating means cooperating with one of said cams for shifting the same axially to vary the output of the pump.

4. In means for feeding fuel to an internal combustion engine, a stationary cone, a rotor having a conical socket wholly supported by said cone and upon which said rotor is adapted to revolve, a plunger carried by the rotor having individual spaced non-rotatable cams each cooperating with an independent one of the rollers to reciprocate the plunger while the rotor revolves and oscillating means cooperating with one of said cams to shift the same axially to vary the output of the pump.

5. In a fuel feeding means for internal combustion engines, a stationary casing, a stationary conical member, a rotor having a conical socket wholly mounted upon said stationary member and upon which said rotor is adapted to revolve, plungers carried by the rotor, non-rotatable spaced cams cooperating with the plungers to reciprocate the latter when the rotor revolves, means cooperating with one of the cams to shift the same axially with respect to the other cam to vary the output of the pump and means for limiting the movement of the plungers on both the intake and exhaust strokes.

6. In a fuel feeding means used in conjunction with multiple cylinder internal combustion engines, a plurality of revolubly mounted displacement members for measuring and feeding fuel through individual ducts for the several cylinders of the engine, a first stationary actuating means operating equally on said displacement members to cause a forward movement thereof, a second stationary actuating means operating equally on the several displacement members to cause a return movement towards the first actuating means, means other than said actuating means for limiting the movement of said displacement members in both directions and oscillating adjusting means to axially adjust one only of said actuating means to vary the amount of the return of the several displacement members all to the same extent for the purpose of regulating the amount of displacement by all equally.

7. A pumping means for internal combustion engines comprising a stationary casing, a stationary cone disposed within said casing, a rotor having a conical socket to receive said cone and upon which the rotor revolves and is wholly supported, means for holding said rotor under tension on said cone, plungers carried by the rotor carrying rollers, spaced non-rotatable cams disposed on the outside of said rollers cooperating independently with the rollers to reciprocate the plungers while the rotor revolves, and means for shifting one of said cams axially relative to the other cam to vary the output of the pump.

8. A fuel feeding means for internal combustion engines comprising a combined pump and distributor, said pump comprising a rotary member provided with a reciprocating piston, rollers carried by said piston, non-rotatable cams cooperating with said rollers, said distributor comprising a stationary member with a longitudinally disposed fuel inlet and a series of intake ports, said members having contacting surfaces inclined to the axis of said members, means for resiliently holding said members together, a fixed over-travel sleeve for limiting the movement of said piston in one direction and a spring-pressed over-travel sleeve for limiting the movement of the piston in the other direction.

9. In a fuel feeding means for internal combustion engines, comprising a combined pump and distributor, said pump comprising a rotary member having a reciprocating piston, said distributor comprising a stationary member upon which said rotary member is entirely supported, said members having contacting surfaces inclined to the axis of said members, non-rotatable individual and independent cams for reciprocating said piston, means for adjusting one of the cams axially to vary the stroke of the piston, and means for limiting the movements of said piston in respect to said cams.

10. A fuel feeding means for internal combustion engines comprising, in combination, a casing having a conical seat, passages extending radially outwardly from said conical seat, a cone-shaped distributor extending into said casing and seated near its base in the conical seat of said casing and having ports some of which register with the passages in said casing, a pumping member having a conical recess in which said distributor is received and cylinder and piston means disposed substantially entirely opposite the distributor, said cylinders having ports adapted to register with other ports in said distributor, and means carried by said casing for reciprocating said pistons in timed relation to the relative rotation of said distributor and pumping member.

11. A fuel feeding means for internal combustion engines comprising, in combination, a casing having a conical seat, a ported conical shaped distributor extending into said casing and seated near its base in the conical seat of said casing, said distributor having an inlet passage, a pumping member having a conical recess and cylinders and piston means supported on said distributor for relative rotational movement, and a strainer member for the inlet passage secured to said casing to maintain said distributor seated in the casing.

12. In a fuel feeding means for an internal combustion engine, a member having a plurality of cylinders formed therein, a plunger reciprocable in each of said cylinders, spaced cams, said cams and said member being relatively rotatable, means carried by each plunger floatingly disposed between said cams and cooperating therewith during relative rotation of said member and said cams to reciprocate the plunger, and a pair of over-travel sleeves cooperating with the means on said plunger to prevent said plunger from overrunning the peaks on said cams.

13. In a fuel feeding means for an internal combustion engine, a rotor, a plunger carried by the rotor, spaced non-rotatable cams, means carried by said plunger floatingly disposed between said cams and cooperating therewith during rotation of said rotor to reciprocate the plunger, and a pair of over-travel sleeves cooperating with the means on said plunger to prevent said plunger from overrunning the peaks on said cams.

14. In a fuel feeding means for an internal combustion engine, a rotor, a plunger carried by the rotor, spaced non-rotatable cams, means carried by said plunger disposed between said cams and cooperating therewith during rotation of said rotor to reciprocate the plunger, a fixed and a movable over-travel sleeve cooperating with the means on said plunger to prevent said means from overrunning the peaks on said cams, and means cooperating with one of said cams for shifting said cam axially to vary the output of the fuel feeding means.

15. A fuel feeding means for an internal combustion engine comprising a casing, a rotor rotatable within said casing and having a cylinder, a plunger carried by said rotor and reciprocable within the cylinder, a first cam carried by said casing, a second cam spaced from said first cam and adjustably mounted on said casing for axial movement toward or away from said first cam, a cam follower carried by said plunger and disposed between said cams and cooperating therewith during the rotation of said rotor to reciprocate said plunger, a first over-travel sleeve disposed opposite said first cam limiting the movement of said cam follower away from said cam, and a second over-travel sleeve disposed opposite said second cam and limiting the movement of said follower away from said second cam.

16. A fuel feeding means for an internal combustion engine comprising a casing, a rotor rotatable within said casing and having a cylinder, a plunger carried by said rotor and reciprocable within the cylinder, a fixed exhaust cam, an intake cam adjustably mounted on said casing for axial movement toward or away from said fixed exhaust cam, a cam follower carried by said plunger disposed between said cams and cooperating therewith upon rotation of said rotor to impart intake and exhaust strokes to said plunger, a fixed over-travel sleeve disposed opposite said exhaust cam and operating to prevent the cam follower from overrunning the peaks of said exhaust cam upon an exhaust stroke of the plunger, and a movable over-travel sleeve disposed opposite the intake cam to prevent overrunning of the plunger on an intake stroke.

17. A fuel feeding means for internal combustion engine comprising a casing, a rotor rotatable within said casing and having a cylinder, a plunger carried by said rotor and reciprocable within the cylinder, a first cam carried by said casing, a second cam carried by said casing spaced axially from said first cam, said cams being relatively adjustable axially, and a cam follower carried by said plunger and disposed between said cams and cooperating therewith during the rotation of said rotor to reciprocate said plunger, said follower comprising a plurality of rollers for independent cooperation with said cams.

18. In a fuel feeding means for an internal combustion engine, a rotor, a plunger carried by the rotor, spaced non-rotatable cams, a follower carried by said plunger floatingly disposed between said cams and comprising two rollers each cooperating with one only of said cams during rotation of said rotor to reciprocate the plunger, and a pair of over-travel sleeves cooperating with the rollers on said plunger to prevent the plunger from overrunning the peaks on said cams.

19. In a means for feeding fuel to an internal combustion engine, a rotor, plungers carried by the rotor provided with rollers, spaced non-rotatable cams cooperating independently with said rollers for reciprocating the plungers when the rotor revolves, an over-travel sleeve having a connection with one of said cams, and means for axially adjusting said cam.

20. In a means for feeding fuel to an internal combustion engine, a rotor, a plunger carried by the rotor provided with spaced rollers, spaced non-rotatable cams cooperating independently with said rollers to reciprocate the plunger while the rotor revolves, one of said cams being fixed and the other movable, and an over-travel sleeve carried by the movable cam.

21. In a fuel feeding means used in conjunction with multiple cylinder internal combustion engines of the spark ignition type, a plurality of revolubly mounted displacement members for measuring and feeding fuel through individual ducts to the several cylinders of the engine, adjustable actuating means operating upon said displacement members to cause movement thereof in one direction, stationary actuating means operating equally on the several displacement members to cause a return movement towards the first actuating means, means carried by one of the actuating means for limiting the movement of said displacement members in both directions, and means for axially adjusting one of said actuating means to vary the amount of return of the several displacement members all to the same extent for the purpose of regulating the amount of displacement by all equally.

22. In a fuel feeding and mixture controlling means for internal combustion engines of the spark ignition type, a rotary pumping unit having a plurality of pumping elements, spaced non-rotatable cams for reciprocating said elements, means for adjusting one of said non-rotatable cams to vary the stroke of said pumping elements, and an over-travel sleeve detachably connected to one of said cams for limiting the movement of said pumping elements.

23. A means for feeding fuel to an internal combustion engine, a rotor, a plunger carried by the rotor provided with spaced rollers, spaced non-rotatable cams cooperating independently with said rollers to reciprocate the plungers while the rotor revolves, a fixed and a movable over-travel sleeve cooperating with said rollers, said movable over-travel sleeve being carried by one of said cams, and means for adjusting said cam axially to vary the output of the pump.

24. A fuel pump and distributor for internal combustion engines having a rotor provided with a plurality of reciprocating plungers, spaced rollers carried by said plungers, non-rotatable cams cooperating with said rollers, means for axially adjusting one of said cams, fixed and movable over-travel sleeves cooperating with said rollers, the movable over-travel sleeve being provided with a spring for detachably connecting it to the movable cam.

25. In a means for feeding fuel to an internal combustion engine, a rotor, plungers carried by the rotor provided with rollers, spaced non-rotatable cams cooperating independently with said rollers for reciprocating the plungers when the rotor revolves, an over-travel sleeve having members for connecting it to the intake cam by oscillating said over-travel sleeve in respect to the cam, and means for axially adjusting said cam.

26. In a means for feeding fuel to an internal combustion engine, a casing, a rotor mounted within said casing, a plunger carried by said rotor, a roller shoe mounted within said casing, a driving projection on said plunger having a connection with said roller shoe, a roller carried by said shoe, a roller carried by said driving projection of said plunger, spaced non-rotatable cams cooperating independently with said rollers to reciprocate the plunger when the rotor revolves, and means for adjusting one of said cams axially.

27. In means for feeding fuel to an internal combustion engine, a member, a plunger carried by the member provided with spaced rollers, spaced cams, said member and said cams being relatively rotatable, and said cams cooperating independently with said rollers to reciprocate the plunger during relative rotation of the cams and the member, over travel sleeves cooperating with said rollers, and means cooperating with one of said cams for shifting said cam axially to vary the output of the pump.

28. In a fuel feeding means for an internal combustion engine, a member, pumping means carried by the member including a reciprocable plunger, spaced cams, said cams and said member being relatively rotatable, means carried by said plunger disposed between said cams and cooperating therewith during relative rotation between said member and said cams to reciprocate the plunger, a fixed and a movable over travel sleeve cooperating with the means on said plunger to prevent said means from over-running the peaks on said cams, and means cooperating with one of said cams for shifting said cam axially to vary the output of the fuel feeding means.

29. In a means for feeding fuel to an internal combustion engine, a member, plungers carried by the member provided with rollers, spaced cams, said cams and said member being relatively rotatable, and said cams cooperating independently with said rollers for reciprocating the plungers when the member and the cams have a relative rotation, an over travel sleeve having a connection with one of said cams and means for axially adjusting said cam.

30. In means for feeding fuel to an internal combustion engine, a member carrying pumping means including a reciprocable plunger, individual spaced rollers carried by said plunger, spaced cams, said member and said cams being relatively rotatable, and said cams each cooperating with an independent one of said rollers to reciprocate the plungers while the member and the cams have a relative rotational movement and means cooperating with one of said cams to shift the same axially to vary the output of the fuel feeding means.

MILFORD G. CHANDLER.